(12) United States Patent
Khouli et al.

(10) Patent No.: US 6,308,278 B1
(45) Date of Patent: *Oct. 23, 2001

(54) SUPPLYING STANDBY VOLTAGE TO MEMORY AND WAKEUP CIRCUITRY TO WAKE A COMPUTER FROM A LOW POWER MODE

(75) Inventors: Sami Khouli, Portland; Taha Mughir; Albert Rudy Nelson, both of Hillsboro, all of OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/001,102

(22) Filed: Dec. 30, 1997

Related U.S. Application Data

(63) Continuation-in-part of application No. 08/999,492, filed on Dec. 29, 1997, now Pat. No. 6,092,207.

(51) Int. Cl.[7] .................................................. G06F 1/32
(52) U.S. Cl. ........................................ 713/323; 713/324
(58) Field of Search ................................. 713/300, 310, 713/320–324, 600, 601

(56) References Cited

U.S. PATENT DOCUMENTS

| | | | |
|---|---|---|---|
| 5,167,024 | 11/1992 | Smith et al. ........................ | 713/322 |
| 5,375,247 | * 12/1994 | Hueser ................................. | 713/330 |
| 5,396,636 | * 3/1995 | Gallagher et al. ................... | 713/323 |
| 5,404,544 | * 4/1995 | Crayford .............................. | 713/310 |
| 5,530,879 | 6/1996 | Crump et al. ........................ | 713/323 |
| 5,548,763 | 8/1996 | Combs et al. ....................... | 713/323 |
| 5,579,524 | * 11/1996 | Kikinis ................................ | 713/324 |
| 5,638,541 | 6/1997 | Sadashivaiah ....................... | 713/323 |
| 5,652,890 | * 7/1997 | Foster et al. ......................... | 713/323 |
| 5,652,895 | 7/1997 | Poisner ................................ | 713/322 |
| 5,664,203 | * 9/1997 | Hong et al. .......................... | 713/323 |
| 5,692,197 | * 11/1997 | Narad et al. ......................... | 713/323 |
| 5,708,819 | * 1/1998 | Dunnihoo ............................ | 713/323 |
| 5,721,932 | * 2/1998 | Itoh et al. ............................ | 713/323 |
| 5,742,514 | * 4/1998 | Bonola ............................. | 364/528.21 |
| 5,784,628 | * 7/1998 | Reneris ............................... | 713/300 |
| 5,790,873 | * 8/1998 | Popper et al. ....................... | 713/300 |
| 5,799,196 | * 8/1998 | Flannery ............................. | 713/320 |
| 5,848,281 | * 12/1998 | Smalley et al. ...................... | 713/322 |
| 5,852,737 | * 12/1998 | Bikowsky ............................ | 713/323 |
| 6,092,207 | * 7/2000 | Kolinski et al. ..................... | 713/323 |

OTHER PUBLICATIONS

SMC's PC Input/Output Products, Jul. 10, 1997, Standard Microsystems Corporation, pp. 1–4.
SMC's FDC37C67x, 100 Pin Enhanced Super I/O Controller with Fast IR, Jul. 10, 1997, Standard Microsystems Corporation, pp. 1–2.

(List continued on next page.)

*Primary Examiner*—Sumati Lefkowitz
(74) *Attorney, Agent, or Firm*—Antonelli, Terry, Stout & Kraus, LLP

(57) ABSTRACT

An improved power management system provides a dual mode power supply that supplies normal voltages and standby voltages. When the computer is placed in a power saving mode, the power supply is controlled to cease supplying the normal voltages to conserve power. While the computer is in the power saving mode, the standby power is supplied to specific devices that may be involved in waking the computer. When an I/O device or another device detects computer activity while in the power saving mode, a wake signal is generated and input to a power management device. The power management device then controls the power supply to supply the normal voltages to wake the computer.

17 Claims, 7 Drawing Sheets

OTHER PUBLICATIONS

Bosker, J., & Kienzle, M., Oct. 10, 1997, Fast Infrared Technology for Cordless Connectivity, IBM MicroNews, pp. 1–6.

Mullgrave, Jr., A. Oct. 19, 1997, IBM Chips at 200Mbps Drive 1394 High–Speed Serial Bus, IBM MicroNews, pp. 1–6.

82371AB PCI–To–ISA/IDE Xcelerator (PIIx4), Apr. 1, 1997, Intel Corporation, pp. 1–225.

Advanced Configuration and Power Interface Specification (ACPI), Rev. 1.0, Dec. 22, 1996, pp. 1–1 to 16–260.

* cited by examiner

SUPPLYING STANDBY VOLTAGE TO MEMORY AND WAKEUP CIRCUITRY TO WAKE A COMPUTER FROM A LOW POWER MODE

This application is a continuation-in-part of U.S. Pat. No. 6,092,207, application Ser. No. 08/999,492 filed Dec. 29, 1997, the contents of which is herein incorporated by reference in its entirety.

TECHNICAL FIELD

The present invention relates to power conservation within a digital computer, and more particularly, to a power management system for a desktop computer.

BACKGROUND OF THE INVENTION

Reducing the power consumed by a computer has two significant advantages: 1) less power must be supplied to the computer; and 2) less heat must be dissipated by the computer into the surrounding environment. On a warm day, many businesses pay both for the electricity to power their computers and for the electricity for the air conditioning to cool their buildings.

Reducing power consumption in desktop personal computers (PCS) has recently become a priority. In an office environment, personal computers are often left powered up all day, and sometimes 24 hours a day. In part, this is because booting a PC can take several minutes after power is restored until the PC is usable. PCS are also left on due to user inattention to energy conservation. Nevertheless, most PCS are operating usefully only a small percentage of the business day. While one PC consumes a modest amount of power, hundreds or thousands of PCS left on during the day waste a significant amount of energy. Therefore a need exists to reduce power consumption in a PC during inactivity.

FIG. 1 illustrates a block diagram of a typical computer, such as a PC. PC 110 includes a host processor 112 connected to a local bus 114. Host processor 112 may be, for example, a Pentium® processor available from Intel Corp. for executing instructions and controlling operation of the PC. A dynamic random access memory (DRAM) card 120 and a memory controller 122 are also connected to local bus 114. A Peripheral Component Interface (PCI) bus 124 is connected to a magnetic hard disk drive (HDD) 134, a graphics card 136, and one or more PCI expansion slots 128. A local bus/PCI bridge 126 operates as an interface or bridge for local bus signals and PCI bus signals. PC 110 also includes an Industry Standard Architecture (ISA) bus 140. The ISA bus 140 is connected to the PCI bus via a PCI/ISA bridge 132. One example of a PCI/ISA bridge 140 is the 8237AB PCI-TO-ISA/IDE Xcelerator (PIIX4), available from Intel Corp. The ISA bus is connected to an audio card 144, one or more ISA expansion slots 138, and a Super input/output (I/O) chip 146. The Super I/O chip includes a keyboard and mouse controller, a floppy drive controller, two serial ports, a parallel port, and an infra-red (IR) port. Many PCS use a Super I/O chip 146 to interface various I/O devices in the PC, such as a keyboard and mouse, floppy drives, printers, and the like. One example of the Super I/O chip is the FDC37C67x 100 Pin Enhanced Super I/O Controller With Fast IR, available from Standard Microsystems Corp.

The PIIX4 chip, the Super I/O chip and the system software (the basic input/output system or BIOS and the operating system) can operate to place the computer into a sleep or power saving mode in which power is conserved. In one power-saving mode for example, a command can be provided to halt the host processor 112 to conserve power. However, in these power-saving modes, the standard operating voltages (3.3V, 5.0V at 10–13 A) are still provided from the power supply to the motherboard and various peripheral components to allow the components to detect activity (e.g., keyboard or mouse movement, LAN activity) and then "wake" the computer to resume normal operation. As a result, a significant amount of power (typically 30–40 Watts) must be supplied from the power supply to the computer during these power saving modes.

When the power supply is plugged in and the external mechanical power switch is not depressed, the power supply typically provides only about 0.1 A of trickle current only to a portion of the PIIX4 chip to allow the PIIX4 chip to detect the depression of the external mechanical power switch. The PIIX4 chip and the system software operate to reestablish normal power and cold boot the computer when the PIIX4 chip detects the depression of the external power switch. However, because power is not applied to any other portion or component of the computer, it is impossible to "wake" the computer from this mechanical Off state. Therefore, a need exists for an improved power management system that allows a peripheral or component to wake the computer from a power saving mode while consuming less power.

SUMMARY OF THE INVENTION

The power management system of the present invention overcomes the disadvantages of the prior art by supplying only a standby voltage to a portion of the computer that may be involved in waking the computer. Computer activity is detected, and then a wake signal is generated in response to the computer activity. The normal voltage is supplied to the computer in response to the wake signal.

DETAILED DESCRIPTION

Figure 2:
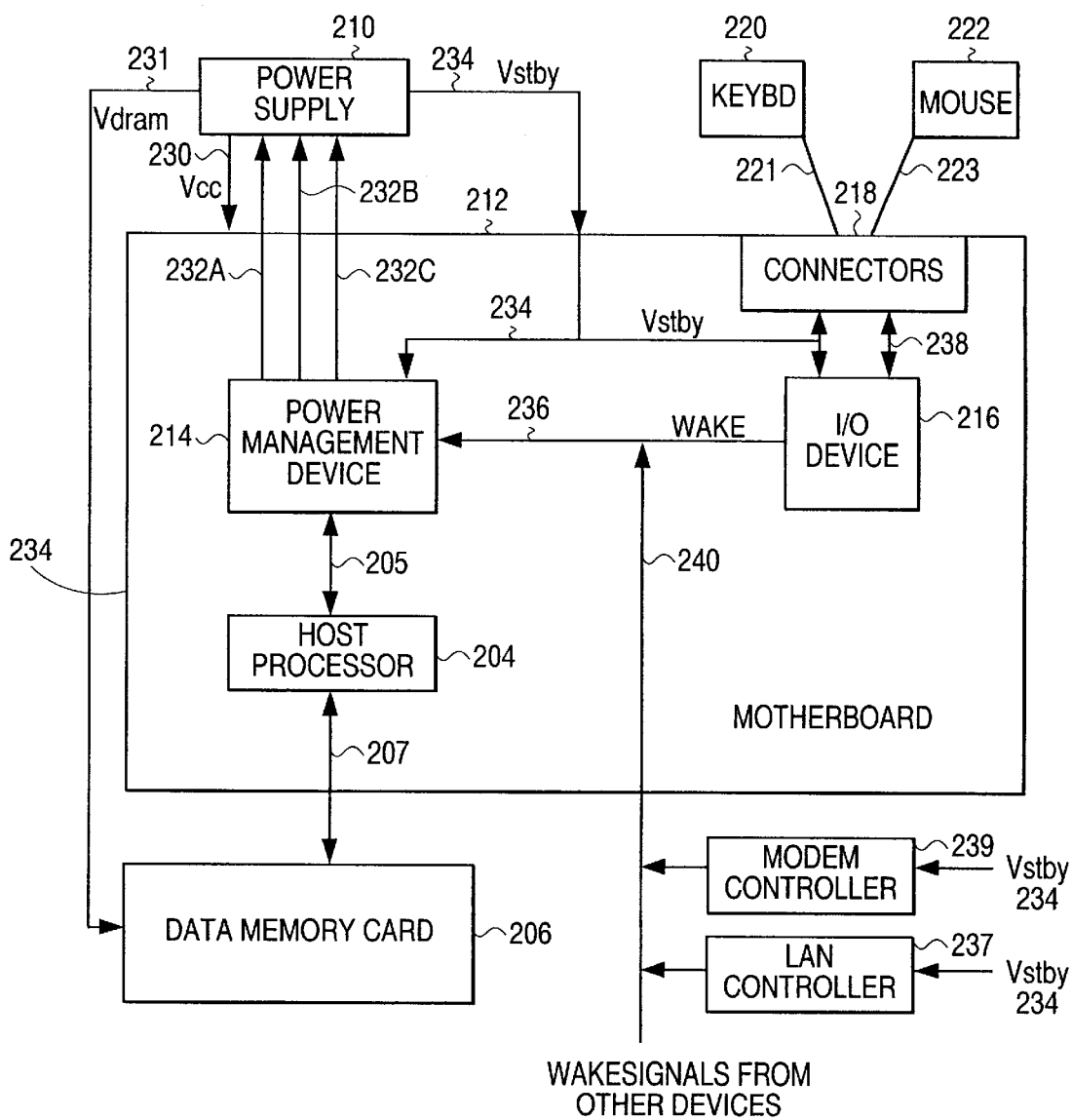
FIG. 2 illustrates a block diagram of a portion of a computer including an improved power management system according to an embodiment of the present invention.

Referring to the drawings in detail, wherein like numerals indicate like elements, FIG. 2 illustrates a block diagram of a portion of a computer 200 including an improved power management system according to an embodiment of the present invention.

A motherboard 212 is illustrated that includes several components thereon, including a host processor 204 for decoding and executing software and controlling the operation of the computer. Host processor 204 may be a Pentium® processor or the like available from Intel Corp. A dynamic random access memory (or DRAM) card 206 is coupled to the motherboard 212 via line 207. A dual mode power supply 210 is coupled to motherboard 212 via line 230, lines 232A–C and line 234 and supplies multiple voltages. Computer 200 includes a keyboard 220 and a mouse 222. Computer 200 may include additional peripheral devices, such as a local area network (LAN) controller 237, a modem controller 239, a monitor or display (not shown), etc. The keyboard 220 and mouse 222 are connected to keyboard and mouse connectors 218 on motherboard 212 via cables 221 and 223, respectively.

A power management device 214 is coupled to host processor 204 via line 205 for managing the different power saving modes for computer 200. Power management device 214 can be, for example, a PIIX4 device or the like, available from Intel Corp.

Figure 1:
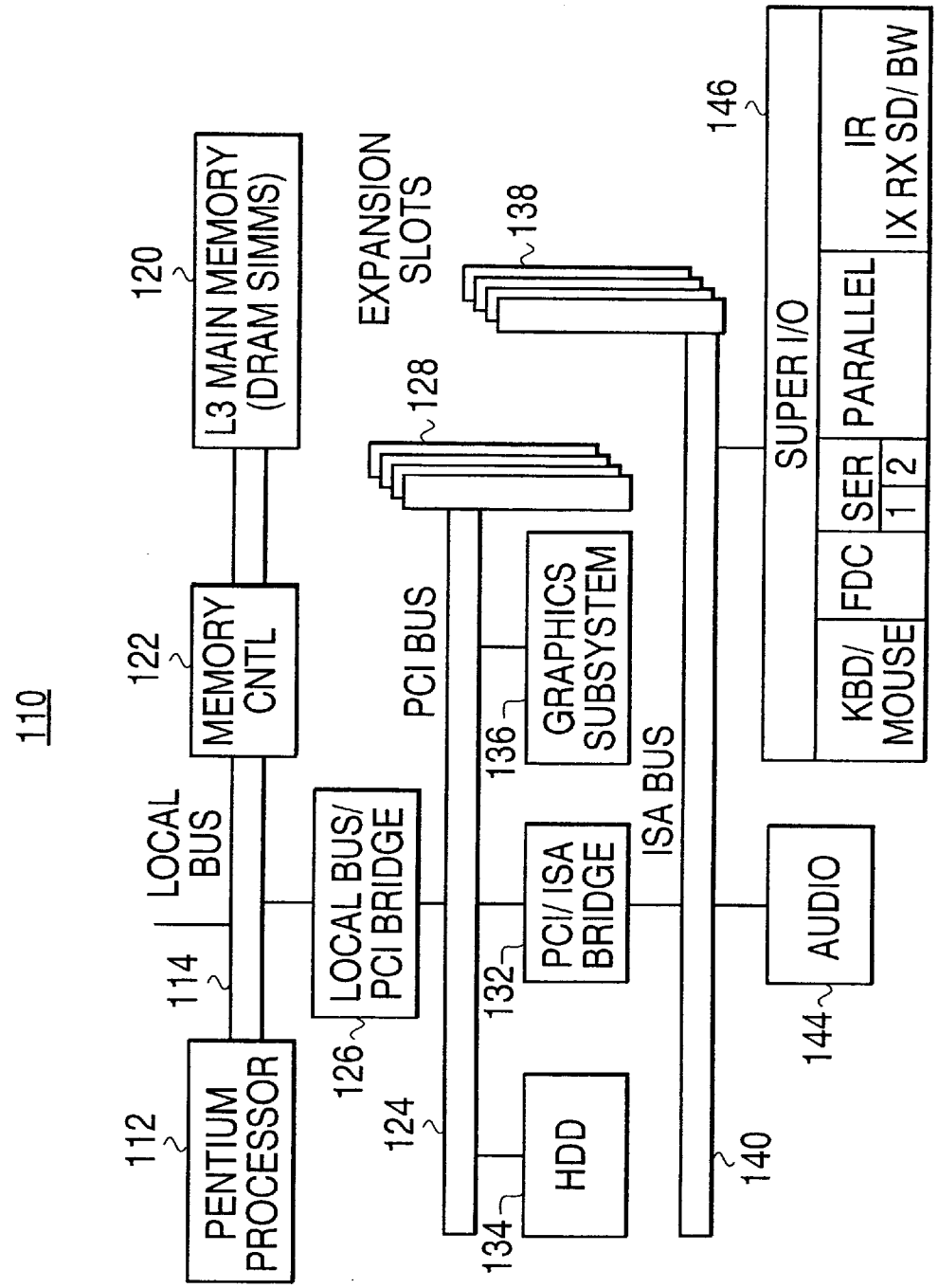
FIG. 1 illustrates a block diagram of a computer.

An input/output (I/O) device 216 is coupled to connectors 218 via interface lines 238 and to power management device 214 via control line 236. I/O device 216 interfaces various I/O devices (such as keyboard 220, mouse 222 and other devices) to the host processor 204. Interface lines 238 include serial data lines and clock lines for both keyboard 220 and mouse 222. The I/O device 216 includes at least a keyboard and mouse controller. I/O device 216 can be a Super I/O chip, available from Standard Microsystems Corp., or a similar I/O device. Computer 200 may include additional conventional devices, as shown, for example, in FIG. 1

Dual mode power supply 210 provides one or more normal voltages ($V_{CC}$), one or more standby voltages ($V_{STBY}$), and a DRAM voltage ($V_{DRAM}$). As in previous computers, a trickle current of 0.1 A is also provided from power supply 210 to a portion of the power management device 214 to detect the depression of the external mechanical power switch, not shown. However, this small trickle current was not used in past computers to wake the computer. Moreover, this trickle current (0.1 A) is generally insufficient to power the various devices that may be involved in waking the computer.

The normal voltages, include, for example, one or more of 3.3 Vdc, 5.0 Vdc, and 12.0 Vdc. Each normal voltage is provided at a current up to a maximum of 13 A (as an example). These normal voltages are applied to all devices of computer 200 during normal operation. The normal voltages ($V_{CC}$) are provided from power supply 210 to motherboard 212 via line 230. The normal voltages can be selectively provided by power supply 210 to all peripheral devices and all components of the computer via a power-plane in motherboard 212.

The standby voltages can include 3.3 Vdc, 5.0 Vdc and 12.0 Vdc (as examples), but up to a maximum current of 0.5 A (for example). The current of the standby voltages should be sufficient to allow various peripheral devices or other components to wake the computer upon detecting computer activity. The standby voltages ($V_{STBY}$), can also be selectively provided from power supply 210 to motherboard 212 via line 234. However, unlike the standard voltages (which are provided to all computer devices when supplied by power supply 210), the standby voltages are provided only to selected devices of the computer that may be involved in waking the computer from a power saving mode upon detecting computer activity (e.g., upon detecting mouse or keyboard movement, LAN or modem activity, etc.). For example, in computer 200, the standby voltages are supplied via line 234 and the motherboard 212 only to connectors 218 (to allow keyboard 220 and mouse 222 to wake the computer), to I/O device 216 (to detect activity on keyboard 220, mouse 222 and other peripherals), to power management device 214 (to manage the various power saving modes and wake the computer based on control signals received over line 236 from I/O device 216 during a power saving mode), modem controller 239 and LAN controller 237. Other devices of computer 200 (such as host computer 204) will not receive the normal voltages or the standby voltages during a power saving mode to conserve power.

Power supply 210 also provides a DRAM voltage to memory card 206 via line 231 during a suspend-to-RAM (STR) power saving mode, described in greater detail below. The DRAM voltage is sufficient to maintain the contents of DRAM memory card 206. According to an embodiment of the present invention, a standby voltage can be used for the DRAM voltage (for example, a 3.3V standby voltage).

In a normal operating mode, the normal voltages are provided from power supply 210 to all computer devices. In addition to the normal mode, computer 200 can be placed in at least two power saving modes. In a suspend-to-RAM (STR) mode, the operating system, application software, data, graphics information and other information are stored in DRAM memory card 206. Once the computer has been placed in the STR mode, the DRAM voltage is applied to DRAM memory card 206 via line 231, the standby voltages are applied to the devices that may be involved in waking the computer (wake devices), including connectors 218, a LAN controller (not shown), a modem controller (not shown), I/O device 216 and power management device 214. Power supply 210 then ceases providing the normal voltages to computer 200 in order to conserve power. From this state, computer 200 can be warm-booted rapidly because it is unnecessary to re-load the operating system and the application software into DRAM memory card 206.

In a suspend-to-disk (STD) mode, the operating system, application software, data, graphics information and other information are stored in the magnetic hard disk drive (HDD), not shown. Once the computer has been placed in the STD mode, the standby voltages are applied to the wake devices (which may be involved in waking the computer), and power supply 210 ceases providing the normal voltages to the computer to save power. Additional power savings can be obtained in the STD mode (as compared to the STR mode) because the DRAM voltage is not supplied. While the operating system and application software must be re-loaded into DRAM memory card 206, the application and graphics data can be restored to place the computer in the same state as it was just prior to when the computer was placed in the STD mode. Similarly, computer 200 may be placed into other power saving modes.

The operation of computer 200 and the improved power management system of FIG. 2 will now be described. System power management according to the present invention operates under hardware and system software control. The system software includes a Basic Input/Output System (BIOS) and an operating system (OS) that include power management features. The system software can be used to set up a desired power management mode. The hardware monitors the system for events which may require changing the system power mode. When one of these events is detected, the power management device 214 (e.g., a PIIX4 chip) informs the system software of the event, and the system software makes the decision to change power modes. The power management device 214 then provides the proper power control signals via lines 232A–C to power supply 210 to instruct power supply 210 to provide only required voltages during the selected power saving mode.

In the system of FIG. 2, the standby voltages are provided to the wake devices only during a power saving mode. Alternatively, the standby voltages are continuously provided to the wake devices (during both normal and power saving modes). Computer 200 can be programmed to automatically enter into power saving modes in several different ways. In one embodiment, during power-up, the user accesses the BIOS set-up screen and selects "wake on keyboard." By selecting the "wake on keyboard" option in the BIOS set-up, the computer will automatically be placed into a selected power saving mode when computer inactivity is detected.

When the computer is placed in the power saving mode, the standby voltages are supplied to the keyboard and mouse connectors 218 (and other wake devices) to allow these wake devices to wake the computer 200 without supplying the normal operating voltages to conserve power.

Based on the user's selection of the "wake on keyboard" option, the BIOS and the host processor 204 then program the power management device 214 to automatically place the computer into a power saving mode when the computer is inactive (or under other predefined conditions), and to wake the computer (resume normal operation) when computer activity is detected. Similarly, the I/O device 216 is programmed to detect computer activity (keyboard or mouse movement, LAN or modem activity, etc.), and then notify the power management device 214 of such activity. Host processor 204 can program or initialize the power management device 214 and the I/O device 216 by writing predetermined words or codes to specific registers therein.

When the power management device 214 detects computer inactivity, power management device 214 then uses control signals 232 to instruct power supply 210 to enter one of the power saving modes. A timer, such as the Power Management Timer of the PIIX4 chip can be used to detect when a predetermined period of time has elapsed without any computer activity. The computer is then automatically placed in the power saving mode by outputting power control signals from power management device 214 over lines 232A–C to control the power supply 210.

In one embodiment, the power control signals provided over lines 232A–C can be used to indicate which voltages (normal, standby and DRAM voltages) should be supplied to the computer. For example, line 232A can be used as a normal_voltage_on signal to indicate to power supply 210 that the normal voltages should be supplied to the computer. Line 232B can be used as a DRAM-voltage_on signal to indicate that the DRAM voltage should be supplied to DRAM memory card 206 (during STR mode only).

Where the standby voltages are applied only during power saving modes, line 232C can be used as a stby_voltage_on signal to indicate that the standby voltage should be applied to the wake devices. Where the standby voltages are applied continuously (at all times) to the wake devices, line 232C will not be used. If a PIIX4 device is used as the power management device 214, the normal_voltage_on signal, the DRAM-voltage_on signal and the stby_voltage_on signal can be implemented as the SUSA# (suspend plane A control) signal, the SUSB# (suspend plane B control) signal, and the SUSC# (suspend plane C control) signal, respectively, output from the PIIX4 device to control power supply 210 to selectively apply the different voltages to different power planes.

Once the computer 200 has entered a specific power saving mode by ceasing to supply the normal voltages and supplying the standby voltages to the specific wake devices, I/O device 216 will detect any computer activity, such as mouse movement, keyboard actuation, LAN activity. Keyboard or mouse activity will cause data to be received by I/O device 216 over the mouse or keyboard serial data line of line 238. In response to detecting the mouse or keyboard or other computer activity, the I/O device 216 outputs a wake control signal over line 236 to power management device 214. If the PIIX4 device is used as the power management device 214, the wake control signal 236 can be received by the PIIX4 as a system management interrupt (SMI#) signal or a system control interrupt (SCI) signal.

In response to the wake control signal over line 236, the system software selects a power saving mode and the power management device 214 outputs the appropriate power control signals over lines 232 to power supply 210. If either the STD mode or the STR mode is selected, the normal_voltage_on signal is unasserted to indicate that the normal voltages should not be supplied. If the STR mode is selected, the DRAM-voltage_on signal should be asserted to indicate that the DRAM voltage should be supplied to DRAM memory card 206 via line 231.

Figure 3:
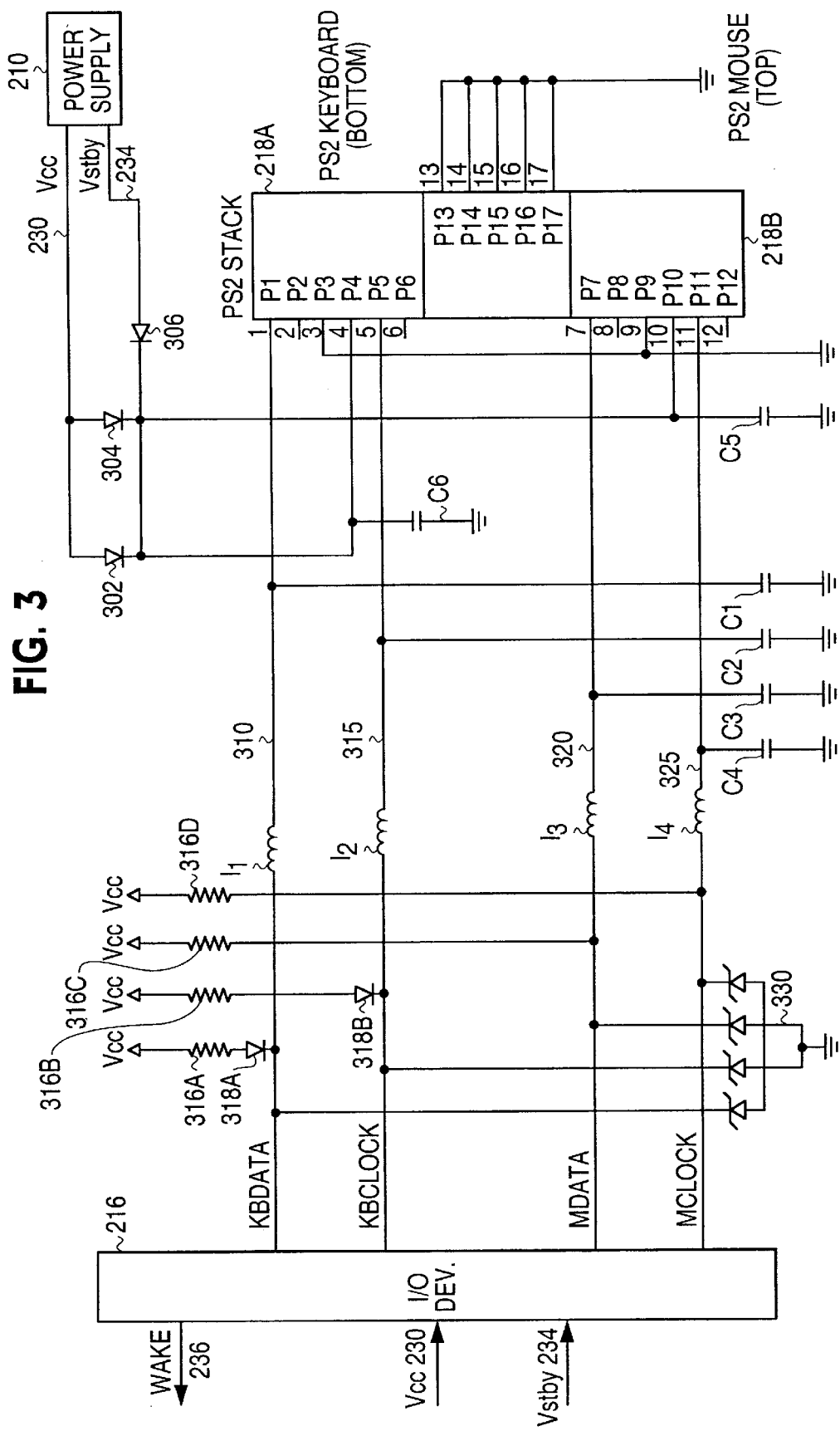
FIG. 3 is a circuit diagram of a computer interface for a keyboard and a mouse according to an embodiment of the computer of FIG. 2.

FIG. 3 is a circuit diagram of an interface for a keyboard and mouse according to an embodiment of the computer of FIG. 2.

The I/O device 216 receives the normal voltages ($V_{CC}$ input 230) and the standby voltages ($V_{STBY}$ input 234A) from power supply 210. The I/O device 216 is connected to connector 218 via keyboard data line (KBDATA) 310, keyboard clock (KBCLOCK) 315, mouse data (MDATA) 320 and mouse clock (MCLOCK) 325. Signals 310, 315, 320, and 325 are connected from I/O device 216 to connectors 218 via inductors I1–I4, are tied to ground via capacitors C1–C4, and are pulled up to $V_{CC}$ via resistors 316A–D, respectively. Diodes 318A and 318B are placed between $V_{CC}$ and the KBDATA line 310 and the KBCLOCK line 315. Connector 218 includes a keyboard connector 218A and a mouse connector 218B.

The power supply 210 outputs the normal voltage $V_{CC}$ 230 and the standby voltage ($V_{STBY}$) 234 to keyboard connector 218A and mouse connector 218B via diodes 302, 304 and 306, and capacitor C6.

The system software notifies the I/O device 216 when the computer is placed in a power saving mode. The I/O device 216 then outputs the standby voltage to keyboard connector 218A and mouse connector 218B to allow the keyboard and mouse to wake the computer. The power supply 210 ceases supplying the normal voltages (e.g., $V_{CC}$) to conserve power. I/O device 216 outputs a wake control signal 236 upon detecting mouse or keyboard activity via data lines 310 or 320. In response to the wake signal, the power management device 214 then controls the power supply 210 to provide the normal voltages to wake the computer.

Figure 4:
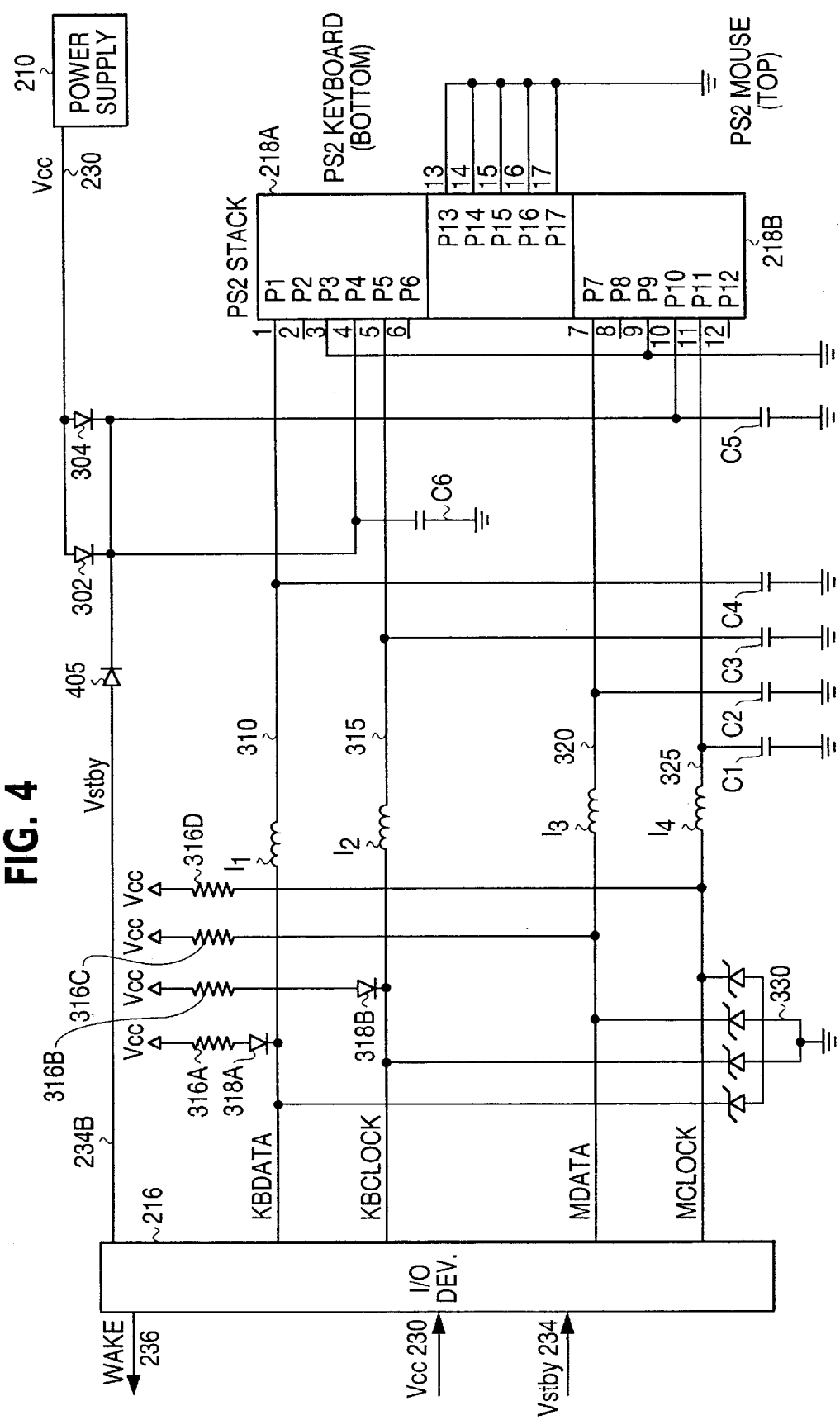
FIG. 4 is a circuit diagram of a computer interface for a keyboard and a mouse according to another embodiment of the computer of FIG. 2.

FIG. 4 is a circuit diagram of an interface for a keyboard and mouse according to another embodiment of the computer of FIG. 2. The circuit of FIG. 4 is very similar to FIG. 3. In FIG. 3, the standby voltage is supplied directly from the power supply 210. However, in FIG. 4, I/O device 216 controls the application of the standby voltages to wake devices, such as a keyboard and mouse. I/O device 216 activates the standby voltage 234 when in the power saving mode. Therefore, in the power saving mode, the keyboard and mouse connectors 218 receive power via the standby voltage from I/O device 216.

Figure 5:
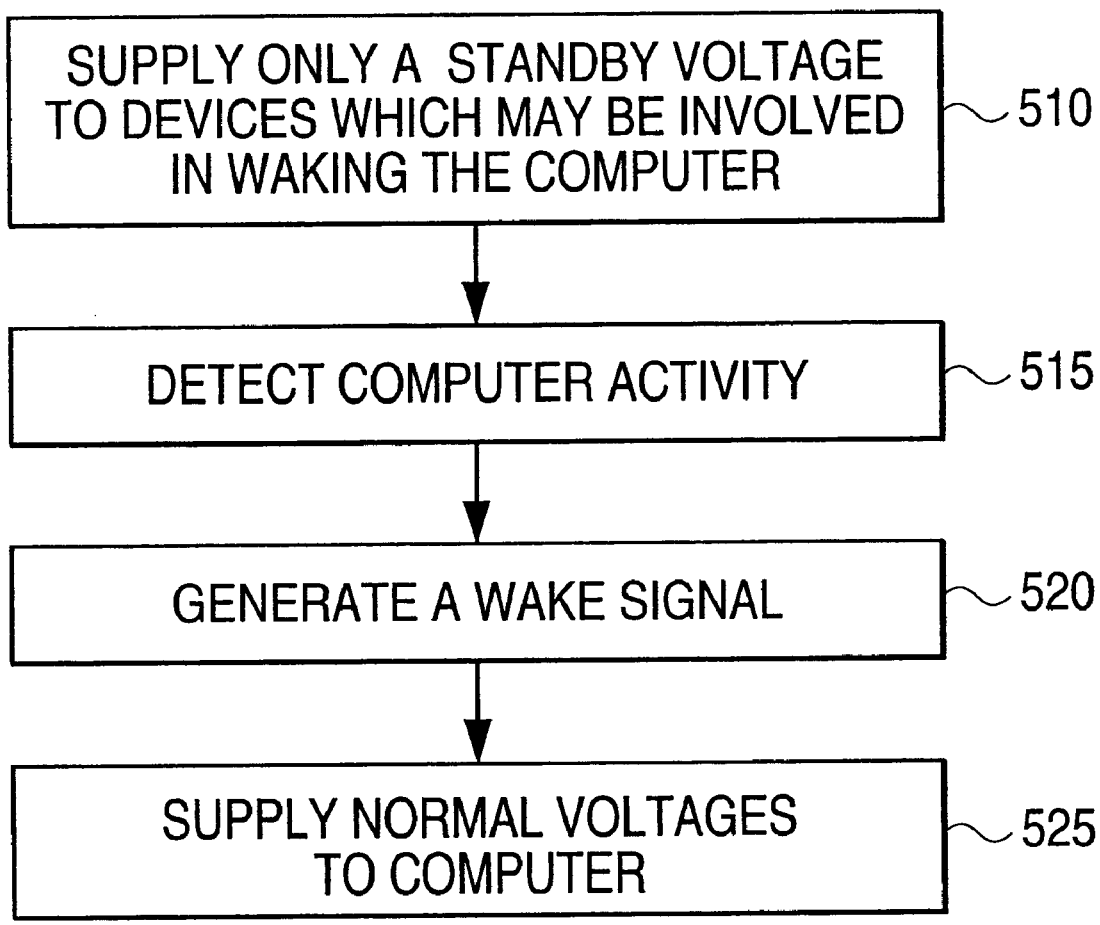
FIG. 5 is a flow chart illustrating a method of waking the computer of FIG. 2 according to an embodiment of the present invention.

FIG. 5 is a flow chart illustrating a method of waking the computer of FIG. 2 from a power saving mode according to an embodiment of the present invention. In step 510, the power supply 210 supplies only the standby voltage when in the power saving mode.

At step 515, the I/O device 216 detects computer activity from the keyboard 220, mouse 222, LAN controller 237, modem controller 239 or other device.

At step 520, I/O device 216 generates and outputs a wake signal in response to detecting computer activity.

At step 525, in response to the wake signal, power management device 214 outputs power control signals to power supply 210 to supply the normal voltages to the computer.

Figure 6:
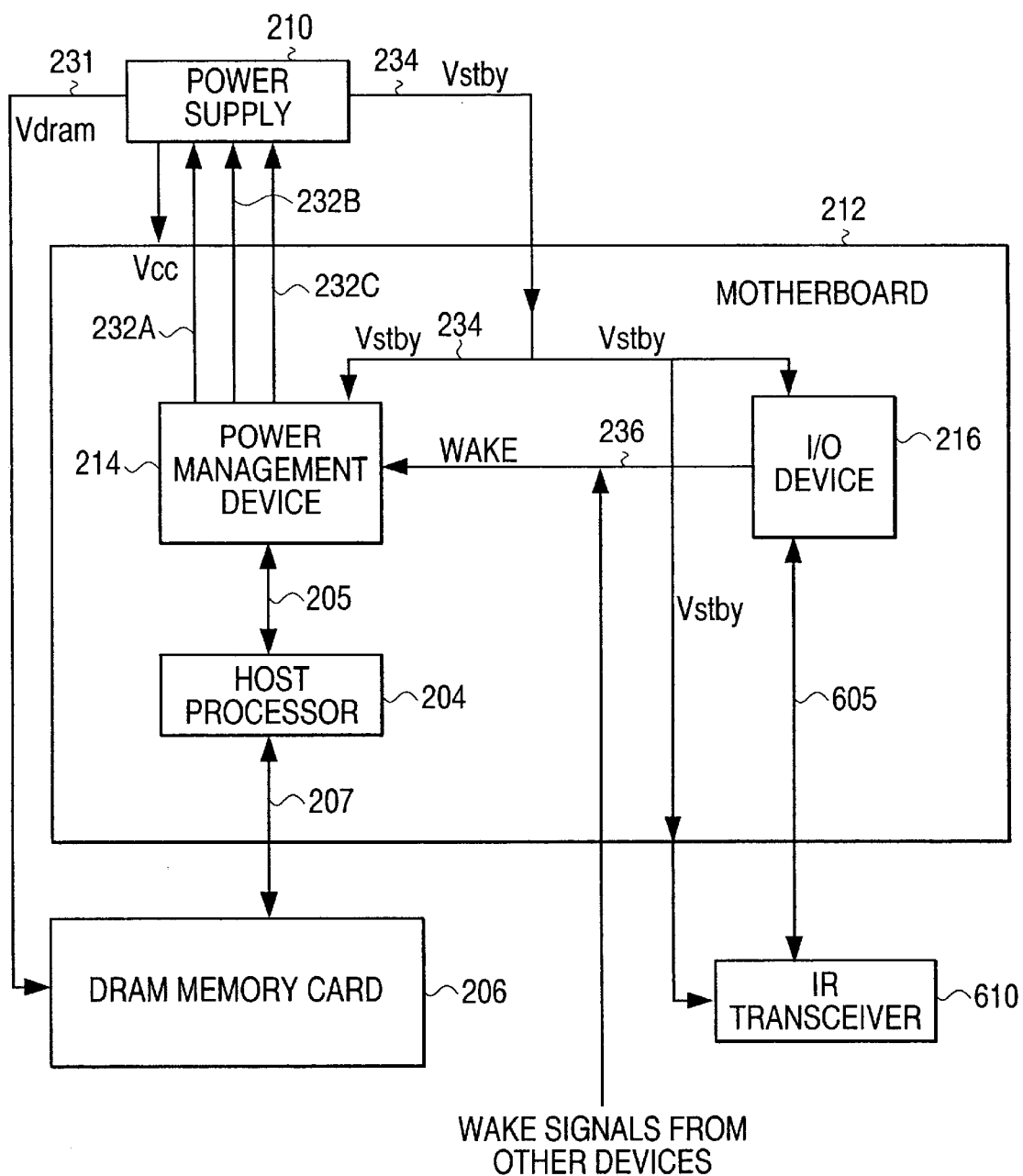
FIG. 6 illustrates a block diagram of a portion of a computer including an improved power management system according to an embodiment of the present invention.

FIG. 6 illustrates a block diagram of a portion of a computer 600 including an improved power management system according to an embodiment of the present invention. Computer 600 includes many of the same components included in computer 200, FIG. 2. Computer 600 also includes an infra-red (IR) transceiver 610 connected to an IR interface of I/O device 216 via control and data signals 605. The IR transceiver 610 transmits and receives IR signals. The IR transceiver converts received IR signals to electrical signals for output to the I/O device 216, and converts electrical signals to IR signals for transmission. The IR transceiver 610 can be used to remotely control computer 600, to download files from a laptop computer to computer 600 without using a cable, and for other applications.

The host processor 204 programs the IR interface of the I/O device 216 to detect a predetermined IR pattern. When the computer is placed in a power saving mode, the power supply 210 ceases supplying the normal voltages. The standby voltage output from power supply 210 over line 234 is supplied to the I/O device 216, the power management device 214, and the IR transceiver 610 to allow IR transceiver 610 to wake computer 600.

When computer 600 is in a power saving mode, the standby power signal allows the IR transceiver 610 to receive an IR signal and forward the IR signal to I/O device 216 for comparison. Because the I/O device 216 also receives the standby voltage via line 234, I/O device 216 compares the received IR pattern to the predetermined IR pattern. If the received pattern matches the predetermined pattern, the I/O device 216 outputs a wake signal over line 236 to power management device 214. As described above in connection with FIG. 2, power management device 214 then outputs the appropriate power control signals over lines 232 to power supply 210. The normal voltages are then supplied from power supply 210 to wake the computer 600.

Figure 7:
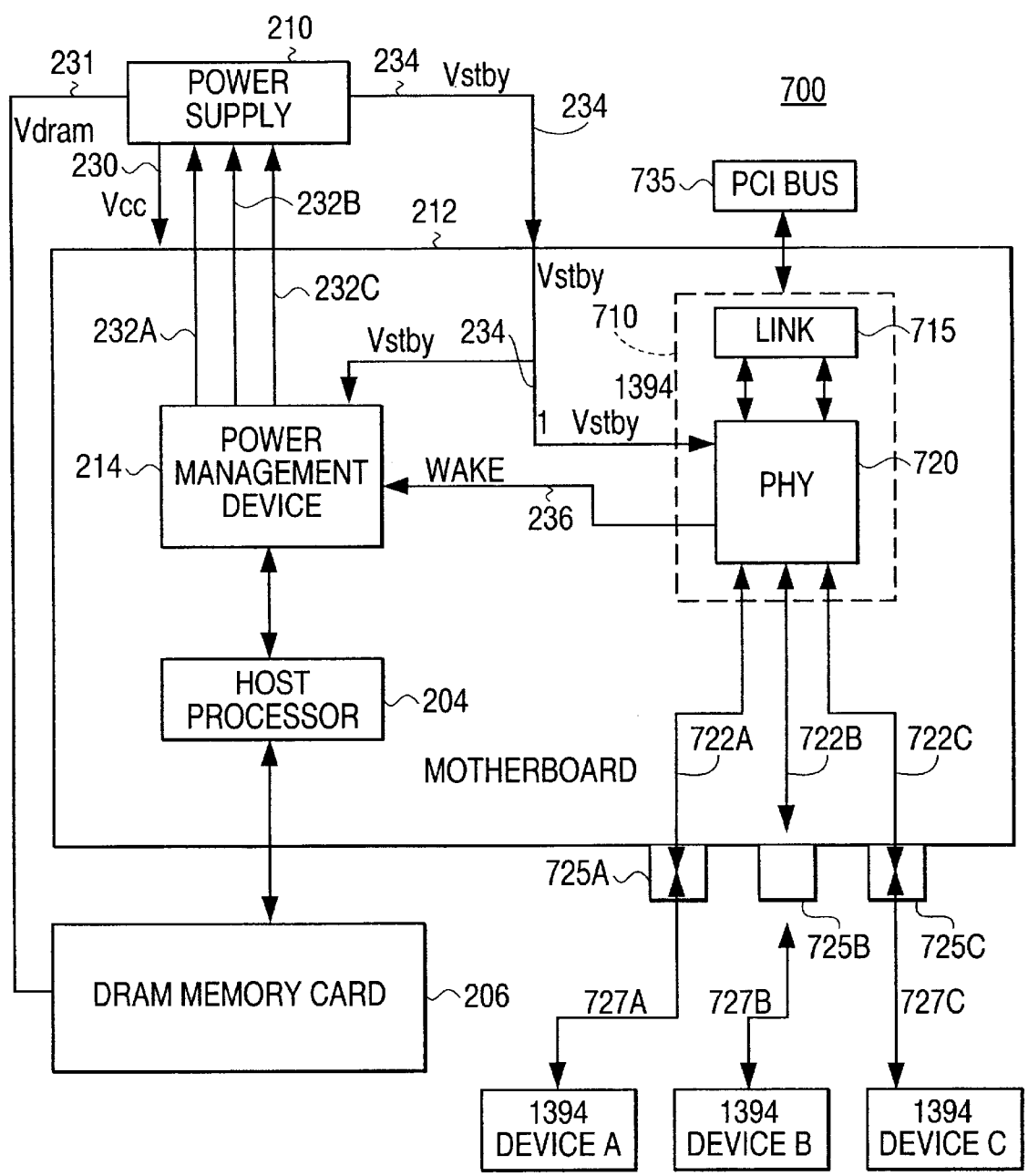
FIG. 7 illustrates a block diagram of a portion of a computer including an improved power management system according to another embodiment of the present invention.

FIG. 7 illustrates a block diagram of a portion of a computer 700 including an improved power management system according to an embodiment of the present invention. Computer 700 includes many of the same components included in computer 200, FIG. 2. Computer 700 also includes an interface 710 for the IEEE 1394-1995 High Speed Serial Bus Standard. The 1394 interface 710 is connected to 1394 ports 725A–C via lines 722A–C, respectively. 1394 Ports 725A–C are connected to 1394 devices A–C via cables 727A–C, respectively. The 1394 interface 710 is also connected to PCI bus 735. Although not shown in FIG. 5, the host processor 204 can communicate with the 1394 devices via the PCI bus 735.

The 1394 bus is a new standard for connecting a variety of audio and video products to a computer, including a VCR, a camcorder, a digital camera, a Musical Instrument Digital Interface (MIDI) device, set-top boxes, High Definition Television (HDTV) sets, local area networks (LANs), etc.

The 1394 interface 710 includes a PHY chip 720 and a Link chip 715. The PHY chip 720 implements the physical layer protocol, and can include drivers and receivers that send and receive data. The Link chip 715 is the implementation of the link layer protocol and the transaction layer protocol. The Link chip 515 sends and receives data by forming it into packets and adding headers. The packets are then sent to a specified 1394 device (or specified 1394 port). When the Link chip 715 wants to send a packet, the Link chip 715 asks the PHY chip 720 to obtain access to the 1394 serial bus. When the PHY chip has gained access to the 1394 bus, the link chip 715 sends parallel data to the PHY for serialization and transmission over the cable 727.

After the computer 700 has been placed in a power saving mode, power supply 210 ceases supplying the normal voltages. The standby voltages are supplied to the PHY chip 720. Even when receiving only the standby voltages, the PHY chip 720 operates to transfer data between any two 1394 ports. For example, a camcorder connected to 1394 port A may be outputting video to be recorded on a VCR, connected to 1394 port B. In such case, the PHY chip 720 transfers the camcorder data to the VCR. While transferring data between ports, the PHY chip 720 monitors the received data for a predetermined pattern. If the received data matches a predetermined pattern, the PHY chip outputs a wake signal over line 236 to power management device 214. Power management device 214 then controls the power supply 210 to output the normal voltages, and thereby wake computer 700.

The improved power management system of the present invention provides a dual mode power supply 210 that supplies normal voltages, standby voltages and DRAM voltages. When the computer is placed in a power saving mode, the power supply 210 is controlled to cease supplying the normal voltages to conserve power. While the computer is in the power saving mode, the standby power is supplied to specific devices that may be involved in waking the computer. These specific wake devices can include, for example, a power management device 214, an I/O device 216, connectors 218, an IR transceiver 610, a PHY chip 720 for a 1394 interface, 1394 ports 725, a LAN controller 237, a modem controller 239, other peripheral devices, and the like. When the I/O device 216 or another device detects computer activity while in a power saving mode, a wake signal is generated and output to the power management device 214. The power management device 214 then controls the power supply to supply the normal voltages and thereby wake the computer.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of waking a computer from a power saving mode comprising the steps of:
   generating a normal voltage and a standby voltage from a dual mode power supply, the normal voltage provided at a normal current and the standby voltage provided at a standby current that is less than the normal current the voltages of the normal power output and the standby power output being approximately the same voltage;
   storing a state of the computer in a computer memory;
   during a power saving mode, supplying only the standby voltage to the computer memory and to a portion of the computer that may be involved in waking the computer;

detecting computer activity;

generating a wake signal in response to detecting the computer activity;

supplying the normal voltage to the computer in response to the wake signal; and restoring the state of the computer based on the information stored in the computer memory.

2. The method of claim 1 wherein said step of supplying only a standby voltage comprises the step of supplying a standby voltage to a power management device and an input/output (I/O) device.

3. The method of claim 2 wherein said step of supplying only a standby voltage further comprises the step of supplying the standby voltage to at least one peripheral device.

4. The method of claim 1 wherein said step of detecting comprises one of the following:

detecting keyboard or mouse activity;

detecting activity on a local area network (LAN) controller;

detecting activity on a modem controller;

detecting activity on an infra-red device; and detecting activity on a 1394 device.

5. The method of claim 1 wherein said step of generating a wake signal comprises the step of:

an I/O device generating a wake signal to a power management device in response to detecting computer activity.

6. The method of claim 5 wherein said step of supplying a normal voltage to the computer comprises the step of:

generating power control signals from the power management device to cause the dual mode power supply to supply the normal voltage to the computer.

7. A method of power management for a computer comprising the steps of:

a dual mode power supply supplying at least a normal voltage when the computer is in a normal operating mode;

storing a state of the computer in a computer memory;

placing a computer in a power saving mode, the power supply supplying a standby voltage to the computer memory and to specific devices that may be involved in waking the computer and ceasing to supply the normal voltage when the computer is placed in the power saving mode, the normal voltage provided at a normal current and the standby voltage provided at a standby current that is less than the normal current, the voltages of the normal power output and the standby power output being approximately the same voltage;

one or more of said specific devices detecting computer activity while the computer is in the power saving mode;

generating a wake signal in response to said step of detecting activity;

controlling the power supply to supply the normal voltage to wake the computer in response to the wake signal; and restoring the state of the computer based on the information stored in the computer memory.

8. The method of claim 7 wherein said step of the computer power supply supplying comprises the step of the power supply supplying a normal voltage and a standby voltage when the computer is in a normal operating mode.

9. The method of claim 7 wherein said step of the computer power supply supplying comprises the step of the power supply supplying only a normal voltage when the computer is in a normal operating mode.

10. The method of claim 7 wherein said standby voltage provides a current that is sufficient to allow the specific devices to detect computer activity and generate the wake signal and is sufficient for the computer memory to store the state of the computer.

11. The method of claim 7 wherein said power saving mode comprises a suspend-to-RAM mode.

12. The method of claim 11 wherein the power supply further supplies a DRAM voltage to computer memory when the computer is placed in the suspend-to-RAM mode.

13. The method of claim 7 wherein said step of detecting computer activity comprises the step of detecting activity from one of the following devices while the computer is in the power saving mode:

a keyboard;

a pointing device;

a network controller;

a modem controller;

a video device;

an audio device;

a 1394 device; and an infra-red device.

14. An apparatus for waking a computer from a power saving mode comprising:

a dual mode power supply supplying a normal voltage during a normal operating mode and only a standby voltage during a power saving mode, the normal voltage provided at a normal current and the standby voltage provided at a standby current that is less than the normal current, the voltages of the normal power output and the standby power output being approximately the same voltage;

a computer memory coupled to the power supply and receiving only the standby voltage storing a state of the computer while the computer is in a power saving mode;

an input/output (I/O) device coupled to the power supply, the I/O device generating a wake signal in response to detecting computer activity while the computer is in a power saving mode;

a power management device coupled to the I/O device and the power supply the power management device receiving the wake signal and controlling the power supply to restore the normal voltage in response to the wake signal.

15. A power management system for a computer comprising:

a dual mode power supply supplying at least a normal operating voltage to the computer during a normal operating mode and supplying a standby voltage only to a portion of the computer during a power saving mode, the normal voltage provided at a normal current and the standby voltage provided at a standby current that is less than the normal current, the voltages of the normal power output and the standby power output being approximately the same voltage;

a power management device coupled to the power supply;

a wake device coupled to the dual mode power supply, the wake device detecting computer activity and generating a wake signal to the power management device;

a computer memory coupled to the dual mode power supply and receiving only the standby voltage and storing a state of the computer during the power saving mode; and in response to the wake signal, the power management device controlling the dual mode power supply to supply the normal operating voltage, and restoring the state of the computer based on the state of the computer stored in the computer memory.

16. A method of waking a computer from a power saving mode comprising the steps of:

generating a normal power output and a standby power output from a dual mode power supply, the normal power output provided at a normal current and the standby power output provided at a standby current that is less than the normal current, the voltages of the normal power output and the standby power output being approximately the same voltage;

storing a state of the computer in a computer memory;

during a power saving mode, supplying only the standby power output to the computer memory and to a portion of the computer that may be involved in waking the computer;

detecting computer activity;

generating a wake signal in response to detecting the computer activity;

supplying the normal power output to the computer in response to the wake signal; and restoring the state of the computer based on the information stored in the computer memory.

17. An apparatus for waking a computer from a power saving mode comprising:

a dual mode power supply supplying a normal power output during a normal operating mode and only a standby power output during a power saving mode, the normal power output provided at a normal current and the standby power output provided at a standby current that is less than the normal current, the voltages of the normal power output and the standby power output being approximately the same;

a computer memory coupled to the power supply and receiving only the standby power output storing a state of the computer while the computer is in a power saving mode;

an input/output (I/O) device coupled to the power supply, the I/O device generating a wake signal in response to detecting computer activity while the computer is in a power saving mode;

a power management device coupled to the I/O device and the power supply, the power management device receiving the wake signal and controlling the power supply to restore the normal power output in response to the wake signal.

* * * * *